United States Patent [19]

Forster, Jr.

[11] 3,796,484

[45] Mar. 12, 1974

[54] OPTICAL COMMUNICATION SYSTEM PROVIDING SELECTIVE IMAGE PRESENTATIONS

[75] Inventor: Harry D. Forster, Jr., Miami, Fla.

[73] Assignee: Holograph Corporation, Watertown, Mass.

[22] Filed: Aug. 20, 1971

[21] Appl. No.: 173,368

Related U.S. Application Data

[63] Continuation-in-part of Ser. No. 850,021, Aug. 14, 1969, abandoned.

[52] U.S. Cl. .............. 353/25, 40/106.52, 40/130 B, 350/31, 353/30, 353/38, 353/82

[51] Int. Cl. . G03b 21/26, G09f 19/14, G02b 27/00

[58] Field of Search ........ 350/31, 32; 353/121, 122, 353/82, 30–32, 38, 25; 40/106.3, 106.41, 106.51, 106.52, 130 R, 130 B

[56] References Cited

UNITED STATES PATENTS

| | | | |
|---|---|---|---|
| 1,114,232 | 10/1914 | Cheron | 350/45 |
| 1,549,579 | 8/1925 | Lenourel | 350/45 |
| 3,192,827 | 7/1965 | Nagy | 353/30 |
| 3,268,238 | 8/1966 | Finkel | 40/106.51 |

*Primary Examiner*—Louis R. Prince
*Assistant Examiner*—Steven L. Stephan
*Attorney, Agent, or Firm*—Ostrolenk, Faber, Gerb & Soffen

[57] ABSTRACT

Arrangement of optical sources in an independent and/or interlocking manner enables presentment of visual information to enhance signing, advertising techniques and other visual display systems. The arrangement may be such as to enable different image elements to have different effective apertures, and to enable projected images to occupy the same position in space but to be independently discernible according to viewer position.

8 Claims, 17 Drawing Figures

Figure 1A:
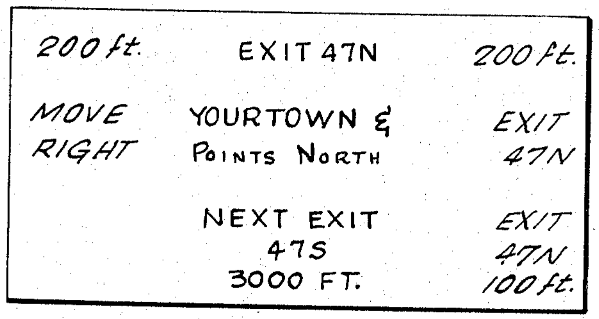

INVENTOR.
HARRY D. FORSTER, JR.
BY
Ostrolenk, Faber, Gerb & Soffen
ATTORNEYS

INVENTOR.
HARRY D. FORSTER, JR.
BY
Ostrolenk, Faber, Gerb & Soffen
ATTORNEYS

INVENTOR.
HARRY D. FORSTER, JR.

BY

Ostrolenk, Faber, Gerb & Soffer

ATTORNEYS

INVENTOR.
HARRY D. FORSTER, JR.

BY
Ostrolenk, Faber, Gerb & Soffen
ATTORNEYS

OPTICAL COMMUNICATION SYSTEM PROVIDING SELECTIVE IMAGE PRESENTATIONS

This application is a continuation-in-part application of Application, Ser. No. 850,021, filed Aug. 14, 1969 and now abandoned.

A second property of the communication system is that the spectrum over which the image can be seen is controllable. That is, by adjusting the viewing cone, information can be selectively presented to only a desired set of viewers, excluding all others. Information can, for example, be projected only to right lane drivers on a super highway. Further, by projecting different messages in each of several viewing cones, multiple messages may be projected from a single source.

Once an image has been found at some projection distance from a source, it has all the optical properties of a real sign, be it traffic or advertising, with the exception that it requires no reflective surface or structure for viewing other than the source. Pictures can be taken of the image just as of a conventional sign and, optically, there is little or no difference.

Many problems exist, however, with present signing techniques - especially as used in highway communications which can be obviated by the optical system of the instant invention. In particular, two common complaints about conventional highway signing are that no sign exists to answer the specific question of the driver and, also, too much information is present on the sign for full comprehension in the short time before it is passed. In addition to these information limitations of signs and signing, there is the additional problem of highway safety. With modern highways, it is necessary that the sign be visible both sooner and for a longer period of time in order that the driver may comprehend the message and have time to react to it. This requires larger signs and heavier construction, which while making visibility and comprehension possible, has given rise to the possibility of increased liklihood of collison with such larger roadside objects.

In an attempt to circumvent some of these limitations of conventional signing, other information channels have been tried in the past. Ideas continually being proposed include: the use of induction radio, triggered prerecorded audio messages, more complex visual displays on the vehicle that are controlled by external signsls, and additional driver aids to reduce the demand from the driver. These systems, however, require vehicle equipment that will have to be developed, tested, and then produced to fit existing vehicles. All of this means long delays and no promise of help for current problems.

Also, it will be well appreciated that the surface condition of a sign is a major factor in its readability. Surface irregularities, such as blotches of mud or snow on the sign or holes in the sign caused by rocks, etc. thrown up from the roadway, greatly affect their readability. These signs, furthermore, require periodic maintenance to rectify the surface conditions caused by weather, age and dirt, and also require periodic replacement brought on by vandalism.

As directed towards highway signing, the communication system of the present invention alleviates these problems by operating on the driver's visual capabilities. Information is presented when and where needed, and particularly, without interference of unnecessary information. The system, furthermore, enables the removal of dangerous structures from travel lanes, and is easily installable and simple to operate.

As will subsequently become clear, such an optical system has the ability to present visual information in such a manner that the apparent carrier of the information (heretofore, the sign) has no mass, and, therefore, is not a crash hazard. The system, in addition, has the ability to better locate the apparent carrier so that the driver can more easily and efficiently receive the message. Furthermore, the system improves upon conventional information presentation to provide depth and guidance clues and selective presentation of messages dependent upon the position of the driver relative to the optical system.

The advantages of such a system are numerous:

a. The system has the ability to selectively present information to viewers according to their needs and position. This property can be used to present unique information to different lanes of traffic or to present different visual informations to separate parts of an audience, or pedestrian traffic either for entertainment, advertising or education.

b. The sign provided by the system appears as an optical image which can effectively be suspended in space without creating a physical obstruction at the viewed location. This positioning or projection capability provides a new vista of freedom in communication. Window displays can be made to appear deeper than their physical dimensions, and to intercept sidewalk pedestrians with advertising material.

c. Along with (b) above, the system makes it possible to control projection distances and viewing angles of individual images so that they appear to move as the observer moves. This apparent motion can be used as a means to improve a sign's impact and therefore, the effectiveness of its visual presentation.

d. The system easily lends itself to reduced vandal susceptibility because images are not formed on a physical mass which vandals can destroy. Minor marking of the face of the source cannot be uniquely related to any particular portion of the image, and therfore does not have as great an effect on legibility as does comparable destruction of conventional signs.

e. The system affords greater freedom than previously existed in the avoidance of vehicle-sign collision. According to the invention, the added freedom of placing the sign further off the road can means a reduction in the number of accidents with fixed obstacles.

Although the present invention will be particularly described as it would be employed in a highway signing environment, it will be appreciated that it has other applications as well. In education and training, for example, a depth dimension can be added to two-dimensional movies and slide presentations to give a new approach to mixed media visual presentation. In aviation, directional runway lighting systems, runway marking and signing systems, aircraft carrier landing systems, and consigned area landing systems for helicopters are also distinct possibilities. Furthermore, the projection, selective presentation and dymanic movement aspect of the system make it particularly attractive for new dimensions in advertising displays.

Figures 1B, 1C:
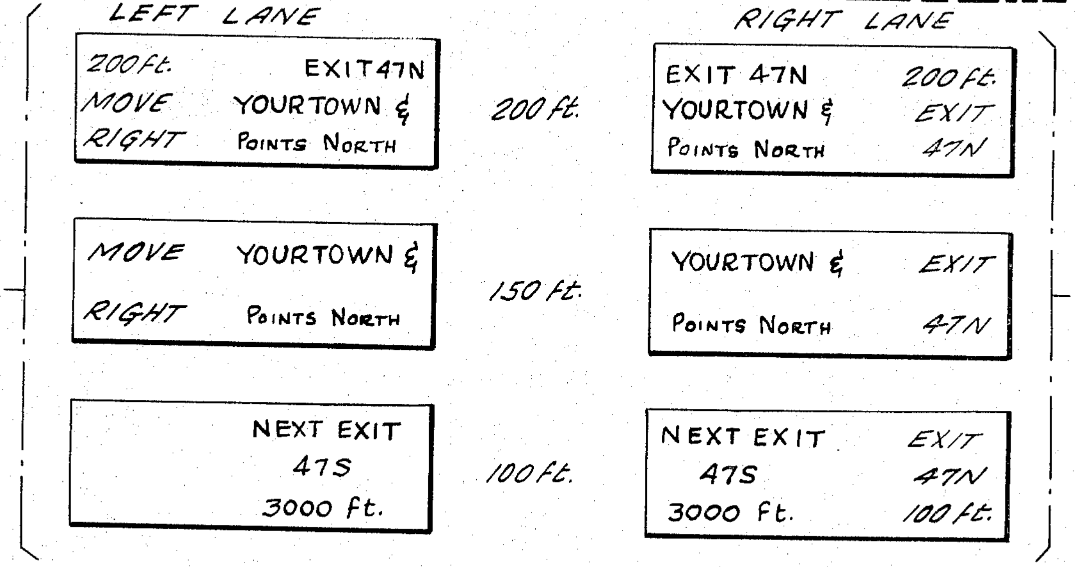

These and other advantages of the present invention will be more clearly understood from the following description taken in accordance with the accompanying drawings in which:

FIGS. 1*a*–1*c* show an example of a highway sign constructed for use in accordance with the system of the present invention, and the appearance of the sign to an oncoming driver; and FIGS. 2–13*a* show schematic image presentations helpful in an understanding of the invention.

DESCRIPTION AND OPERATION OF THE SIGN SYSTEM OF FIGURE 1

FIG. 1*a* shows a highway sign which may be constructed for use in a system according to the present invention. Those messages in the left hand most portion of FIG. 1a would be readily observable to a driver approaching in the left lane of a highway. The information in the right most portion of the sign of FIG. 1a would be observable to a driver approaching in the right lane, and, depending upon the distance from the vehicle to the sign, various messages in the centermost portion of the sign would be observable to either driver. The sign — which may be 25 feet wide and 10 feet high — may be hung over the road with a clearance of 15 feet a support structure set back some 50 feet from an exit. In reality, this sign image does not exist as an actual physical structure but is an optical image which may be created through a holographic imaging system, a holograph lens or Fresnel lens arrangement, a converging mirror system, or any such suitable arrangement operating as the source. The source projecting such an optical illusion is located some distance back from the exit so as not to be a traffic hazard.

FIG. 1*b* shows that portion of the optically hung sign which would be visible at the specified distances to a driver approaching in the right hand lane. FIG. 1c correspondingly shows those presentations that would be made to a driver approaching in the left lane. As will be noted, as a vehicle approaches the apparent location of the sign, the portion of the sign that can be seen changes. In a horizontal plane, the portion of the sign presented moves over in front of the driver while at the same time moving downward.

Thus, according to this selective presentation aspect of the invention, a driver in the right lane at 200 feet would see the upper right half portion of the sign illustrated in FIG. 1*a*. A driver in the left lane would correspondingly see the upper left half portion of the sign. At 150 feet from the sign, a driver in the right hand lane would see the middle right half portion of the sign, while the left lane driver would see the middle left half portion of the sign. At a distance of 100 feet from the sign, the right lane driver would see the lower right half portion of the sign and the driver in the left lane would see the lower left half portion.

The visual presentation thus described will be one dependent upon vehicle position. The driver is not told to move to the right if he is in the right lane, but he is told to move right if he is in the left lane. If the driver is not in a position to leave at the exit (i.e., that he is in the left lane where the exit is to the right), he is informed of the next exit. In this manner, the multiplicity of information that would make a conventional sign confusing to the driver will be selectively presented to the motorist in a more meaningful manner.

Using the sign configuration of the above example and the condition for a motorist 100 feet or more from the apparent structure, the area available for information presentation will be larger than the 10 foot by 25 foot source. The full 25 foot width could be used, however, but the height available would extend from about 5 feet below the source to the top of the source. Hence, the legend area of the imaged sign would be approximately 15 by 25 feet, or approximately 50 percent greater than the area of the source itself. This optically illusioned sign, having no mass, has the additional advantage of not being able to collect rain and snow and hence would not suffer from these factors. This would enhance the visibility of the sign.

DESCRIPTION OF THE IMAGE PRESENTATIONS OF FIGURES 2–10

The optical system of the present invention incorporates three elements — a viewer, the image, and the source. The source may comprise any of the conventional systems outlined above (e.g., the holographic imaging system including, for example, a light source, an object (or objects) and an optical element), and is located a given distance from the region where the image is to be formed. In the highway sign illustration described above, this distance was assumed to be 50 feet for advertising and similar such arrangements, the projection distance may be anywhere from 2 to 20 feet. The distance of the viewer from the projection image is generally regarded as the sight distance, with the visibility and readability of the sign at any particular distance being a function of the eyesight of the viewer. The angle within which a single projected image may be viewed is oftentimes termed the viewing cone, which may vary from 1° to 140°.

In designing such a system, it is of significant importance that the cost, bulk, weight and difficulty of manufacturing large aperture optical systems be kept to a minimum. Since large effective aperture arrangements are most desirable — so that information can be presented at the greatest distances and so that maximum information can be incorporated consonant with readability — a system comprised of smaller individual elements, yet appearing as a large effective aperture system, is most desirable. By providing an arrangement by which large aperture optical systems can be constructed from smaller optical components, the system can be relatively inexpensive to build and maintain, lighter in weight, and in many cases can be one having a smaller volume than comparable conventional systems.

In addition, the present system has the ability to tailor any given viewing field to permit more effective visual communication and more eye catching displays, which are also of prime importance. Image elements having different effective apertures and useful in producing superposed images further enable selective presentation of information. These elements also provide the ability to develop a variable message (i.e. moving), while at the same time keeping the apparent location of the infomration fixed.

FIG. 2–9 schematically illustrate image fields which enable a low cost system to be produced, in which elements of the image field can have different effective apertures, and in which spatial dependence is obtained, but wherein independently discernible information results from viewer position.

Figure 2:
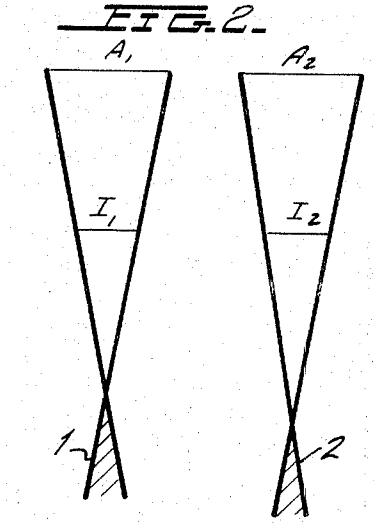

Referring to FIG. 2, it will be noted that an obvious means of creating extended source sizes is to build a matrix or mosaic of sources such that the individual elements operate in harmony to generate a large scale presentation. In the mosaic system of FIG. 2, each image element is generated by a single aperature of an optical source (e.g. the holographic display) represented by a notation $A_n$. The image optically hung in space by the source is represented by a notation $I_n$. An observer located in the shaded areas 1, 2 of FIG. 2, will see the images $I_1$, $I_2$, respectively, with the shaded areas defining the viewing cone for the sources $A_1$, $A_2$. These images may be a stop sign, a yield sign, etc., and are generated independently of one another.

Figure 3:
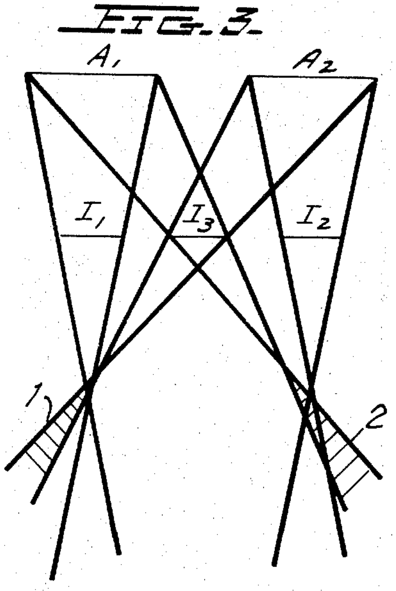

FIG. 3 shows a mosaic in which a composite image is cooperatively and simultaneously generated by two or more optical sources. Image representations $I_1$ and $I_2$ are first developed from sources $A_1$ and $A_2$ independently of each other in the mosaic manner of FIG. 2. Image $I_3$, however, is simultaneously generated by, or interlocked between the apertures $A_1$ and $A_2$. Observers located in shaded region 1 will see image $I_3$ generated by source $A_2$, while observers in region 2 will see the same image, but generated by source $A_1$. As will become clear below, a combination of this interlocking and independent mosaic enables the image elements of a field to exhibit different effective apertures and to have spatial overlappings.

Figure 4:
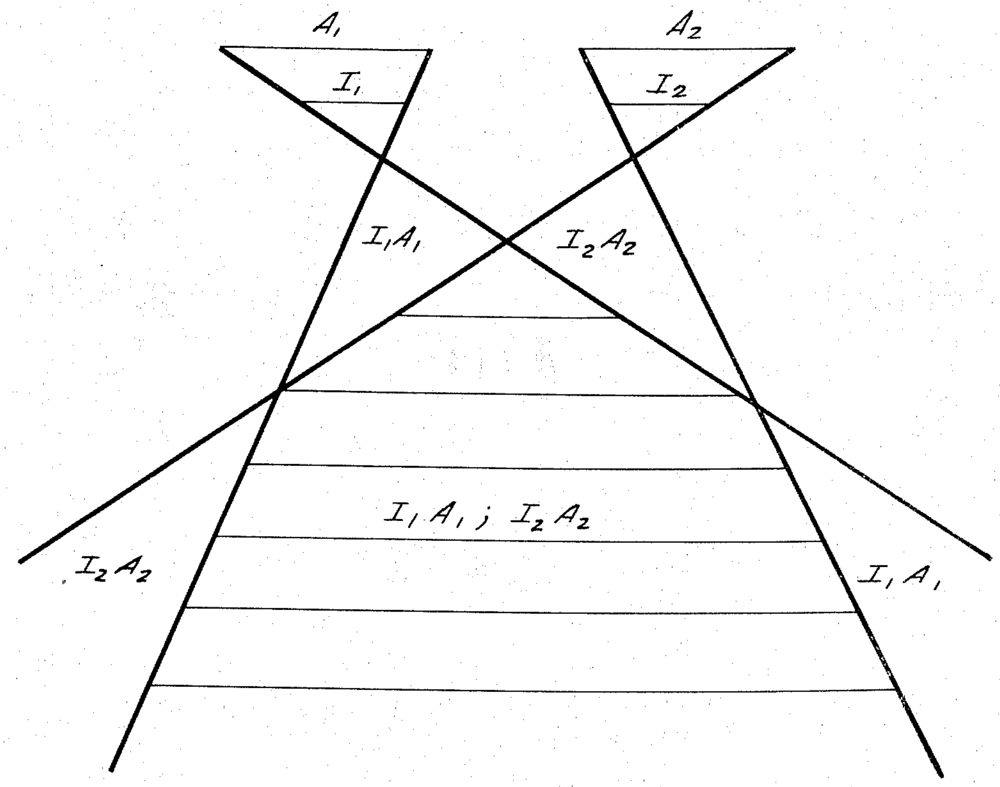

FIG. 4 shows a visual presentation resulting from the superposition of two independent patterns. $A_1$ and $A_2$ represent the aperture sources and $I_1$ and $I_2$ represent the images. The area of combined visibility is indicated by the shaded area, in which an observer can see both images $I_1$ and $I_2$. As the observer moves out of the shaded viewing cone area he loses sight of one of the images, and then of the other.

As will be apparent, each aperture and the image it creates defines a region of space in which the image is visible. These regions can be identified by listing the numbered pairs of images and apertures through which the images are visible. For example, the region $I_1$ $A_1$ means image 1 is visible through aperture 1 in this area. Similarly, the region $I_2$ $A_2$ means image $I_2$ is visible through aperture $A_2$ in this region. In the shaded area of FIG. 4, an observer will see image $I_1$ visible through aperture $A_1$ and, also, image $I_2$ through aperture $A_2$. As he moves to the lower right, he will lose sight first of image $I_2$ and then of image $I_1$. Conversely, as he moves to the lower left, he will first lose sight of image $I_1$ and then of image $I_2$.

Figure 5:
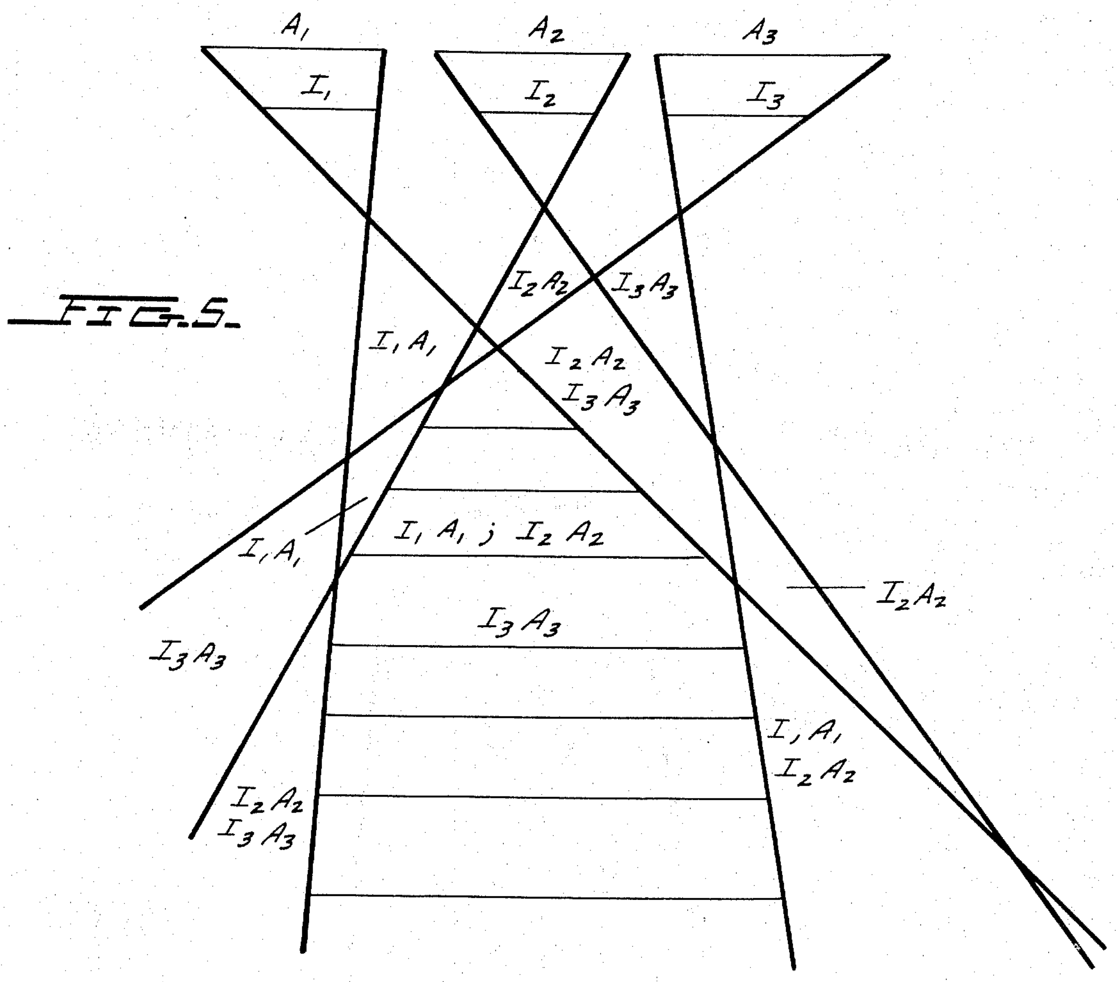

FIG. 5 shows a similar mosaic arrangement extended to cover three independently generated images $I_1$, $I_2$, $I_3$. The number and complexity of definable regions is seen to increase. However, the configuration of FIG. 5 is similar to that of FIG. 4 in the sense that the region of combined vision wherein all images are visible extend unbounded in the downward direction and is flanked to either side by regions of partial vision, wherein only certain of the images are visible. An observer located in the shaded areas of FIG. 5 will see image $I_1$ visible through aperture $A_1$, image $I_2$ visible through aperture $A_2$ and image $I_3$ visible through aperture $A_3$.

Figure 6:
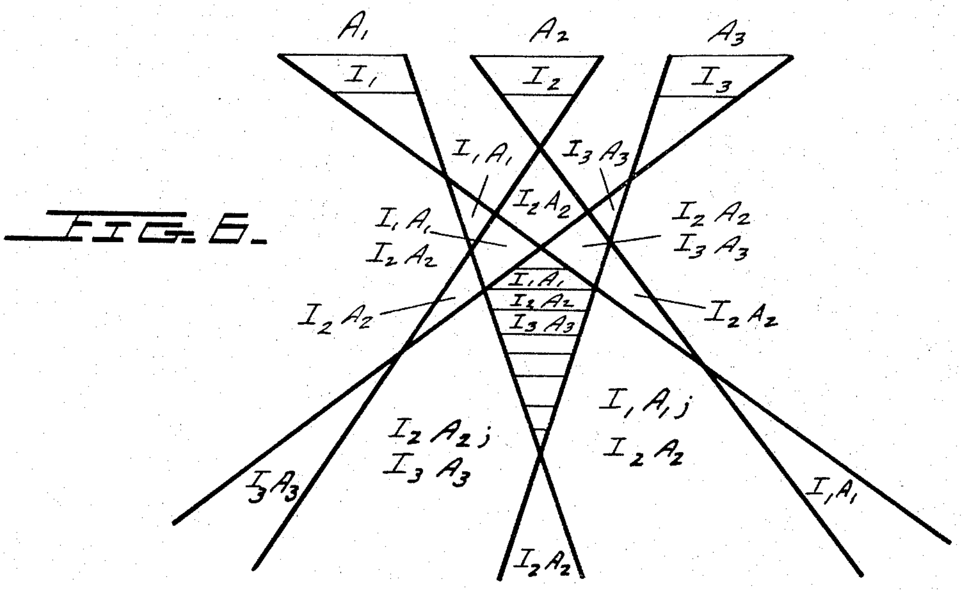

It will be seen that the angles drawn from the respective apertures in the comparable arrangement of FIG. 6 have been so constructed that the region of combined vision, i.e., the shaded area, is bounded on all sides by regions of partial vision. In this manner, the viewing region of complete information may be confined in space. Such a restriction can be used for more precise localization of information to more readily key the area of information recognition. As will be appreciated, if each of the individual images is to be perceived as an element of combined image, then it is necessary that the observers field of vision be one which takes in all elements though the observer be in a given fixed point. In other applications, these images may be desired to create a panorama at which time, changes in the observer's position has the effect of changing the elements in his field of view.

Figure 7:
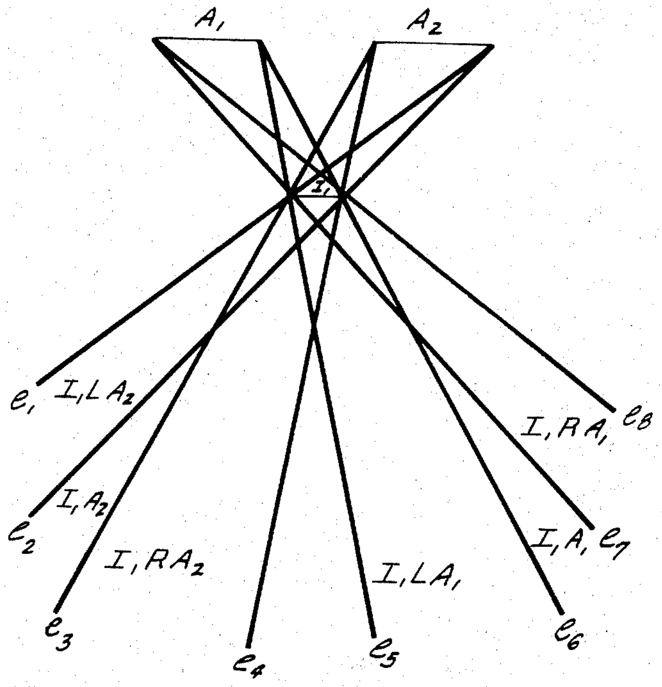

FIG. 7 shows an interlocked mosaic arrangement which in its simplist form entails two sources $A_1$, $A_2$ being used to generate the same image $I_1$. The various viewing angles from the source through the image can be drawn as in the case of the independent mosaic arrangement, and for the sake of completeness, both the total viewing angle and the partial viewing angles have been shown. The total viewing angles are represented by the notations $I_1$ $A_2$ and $I_1$ $A_1$, with a partial viewing angle having an L or R to indicate the left or right-hand sides of the images. Thus, the notation $I_1LA_2$ is the partial viewing area in which the left-hand portion of the image $I_1$ is visible through aperture $A_2$. Similarly, $I_1RA_2$ is the viewing area where the right-hand portion of the image $I_1$ is visible through aperture $A_2$. In a corresponding manner, $I_1LA_1$ and $I_1RA_1$ represent partial viewing areas in which the left-hand portion and right-hand portion, respectively, of the image $I_1$ is visible through aperture $A_1$. In the $I_1A_1$ and $I_1A_2$ areas, the entire image $I_1$ is visible first through aperture $A_1$ and then through aperture $A_2$.

Figure 8:
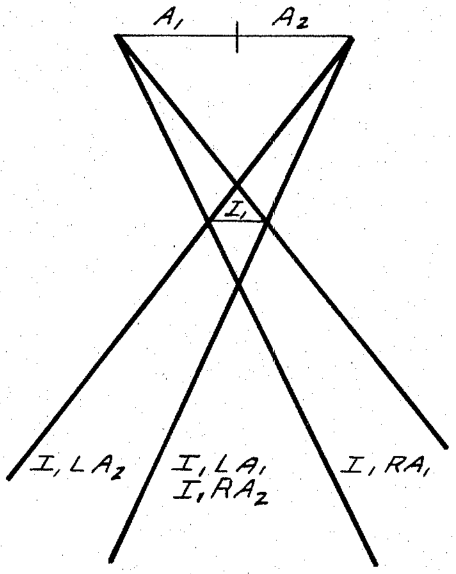

FIG. 8 shows the situation of FIG. 7 in which the sources $A_1$ and $A_2$ are positioned adjacent to one another so that lines $l_3$ and $l_5$ coalesce as do lines $l_4$ and $l_6$. In so doing the region between lines $l_3$ and $l_6$ become a common region defined as $I_1LA_1$, $I_1RA_2$. The resultant diagram becomes that for an aperture size equal to the sum of the two individual apertures.

Figures 9, 10:
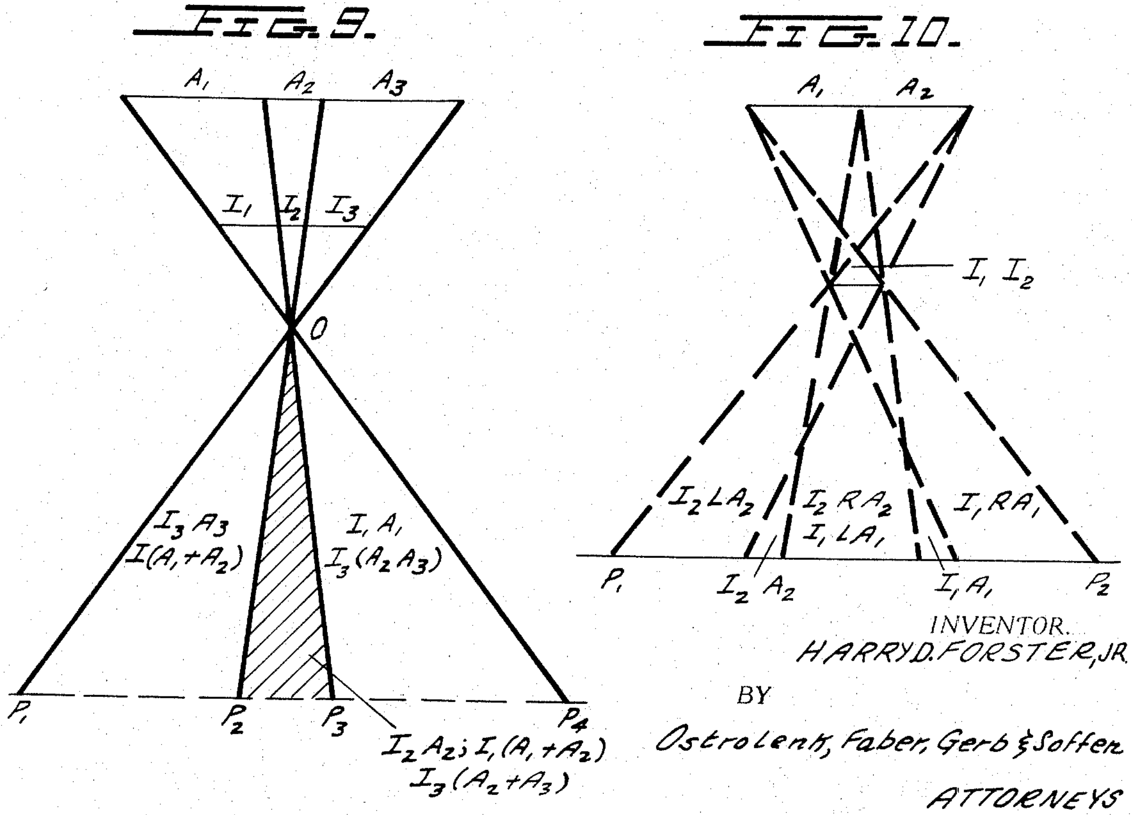

In the previous discussion, the concept of mixed independent and interlocked operation was mentioned as being a means by which spatial super position and variable aperture size are possible. FIG. 9 shows this mixed mode of operation and the manner in which it may be employed to provide different effective apertures for various image elements. Three apertures $A_1$, $A_2$ and $A_3$ are shown as creating an image with elements $I_1$, $I_2$ and $I_3$. For illustrative purposes only, apertures $A_1$ and $A_3$ are shown as being of the same size and larger than $A_2$. Also, the image elements $I_1$, $I_2$ and $I_3$ are assumed to fall on the same plane. If, for example, the three apertures were arranged to project their images on different planes, some images would appear closer to the observer than others, to add an element of depth of one portion of the display with respect to another. As will be seen from the viewing cones illustrated, apertures $A_1$, $A_2$ and $A_3$ are interlocked to provide image elements $I_1$ and $I_3$, while element $I_2$ is provided by aperture $A_2$ alone. the shaded region of total viewing for element $I_2$ thus results from independent mosaic action.

The appearance of the overall image field of FIG. 9 can best be described by assuming an observer to be moving in a straight line from point $P_1$ to point $P_4$. As the observer progresses from point $P_1$ to point $P_2$, he will see all portions of image elements $I_1$ and $I_3$, but not image element $I_2$. In the shaded region from point $P_2$ to point $P_3$, the observer will see all portions of elements $I_1$, $I_2$ and $I_3$, the first and last by virtue of the interlocking operation previously described and the middle image by virtue of the independent operation. Correspondingly, as the observer progresses from point $P_3$ to point $P_4$ the image field will be as in the region from $P_1$ to $P_2$, i.e., the observer will see all of image elements $I_1$ and $I_3$ and not element $I_2$.

The illustration of FIG. 9 points out one application of variable aperture arrangements in advertising. As a shopper passes from point $P_1$ to $P_2$ of FIG. 9, he might see advertisements concerning products I (image element $I_1$) and III (image element $I_3$). In the region from points $P_2$ to $P_3$, advertisements concerning product II (image element $I_2$) would also come into view. In the region from $P_3$ to $P_4$, he would once again see only information pertaining to products I and III. This "changing" effect is often times quite useful in catching the eye of the shopper.

In highway signing on the other hand, a driver might be moving towards the plane containing points $P_1$–$P_4$, rather than along the plane as in the above discussion. Information presentation in the viewing field defined by the extensions of lines O–$P_1$ and O–$P_2$ and of lines O–$P_3$ and O–$P_4$ could be of the type "Kennedy Airport — move right" and "La Guardia Airport — move left" (image elements $I_1$ and $I_3$). Information in the viewing field defined by the extensions of lines $O_{P2}$ and $O_{P3}$ might then also include "road forks ahead" (image element $I_2$). This kind of display is possible with the arrangement of FIG. 9.

FIG. 10 shows a variation of that interlocked mosaic arrangement which enables each source to produce a different image at a same point in space. The arrangement is somewhat similar to the interlocked mosaic arrangement described above in FIG. 7 except that the images produced are not generated by co-operative action of two sources but are produced by each source operating separately, though projecting its image in the same space as the other. The total and partial viewing angles for each aperture $A_1$ and $A_2$ are shown, with the operation again being best described by considering an observer moving from left to right along lines $P_1$–$P_2$. The viewing angles are also shown for purposes of ease of discussion.

In the left most region, the observer would see increasing portions of the left-hand side of image $I_2$ visible through aperture $A_2$. This is so even though image $1_1$ occupies the same physical space as image $I_2$. If the observer moves to the right, he sees the entire image generated by aperture $A_2$ in the second left most space. As the observer progresses further to the right, the left-hand portion of image $I_2$ is replaced by increasing portions of image $I_1$. Thus, in the center most position of FIG. 10, the observer would see the right-hand portion of image $I_2$ visible through aperture $A_1$. Further movement to the right causes the viewer to lose all observance of image $I_2$ and to increase the visibility of image $I_1$ through apertures $A_1$. As will be noted, all visibility will be lost at point $P_2$.

This superposed image arrangement is also useful in the highway signing system wherein images $I_1$ and $I_2$ provide the various information requirements of drivers in different lanes of a highway system. Thus, image element $I_1$ may provide information desirable to a left lane driver while element $I_2$ provides corresponding information for a right lane on-coming vehicle. As the left lane vehicle approaches, he will see information of interest to him (such as move to the right) in going from point $P_1$ to the right in FIG. 10, and will then face the information visible to the right lane driver informing him to exit (further towards point $P_2$). Further passing of this point will provide no further information to him as presumably, he has exited from the right most lane.

One important feature of the present invention is that the type of imaging system employed is not critical. Conventional lens sytems. Fresnel lenses and holography systems are all applicable in the systems described. The only important parameters of operation according to the invention, are, instead, the aperture and image sizes, and their locations and viewing positions.

Figure 11:
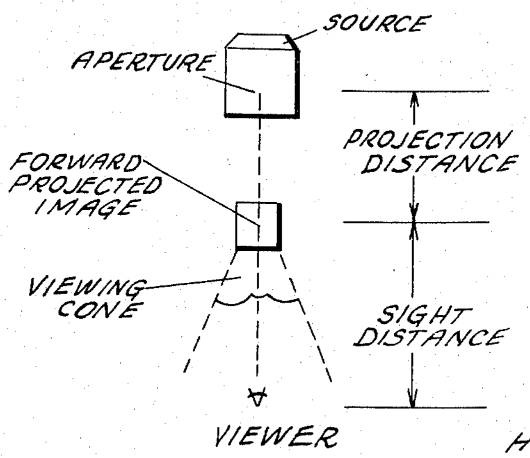

Imaging systems employing rear projection on conventional screens, while appearing to operate in a manner similar to that herein described, would in fact operate in this manner only in a limited form. If the image projection distance of the invention were reduced so that the image would appear to be on the surface of the aperture, then the appearance would resemble that of conventional projection systems. However, this is not the case. Furthermore, a major difference between the operation described above and that of the rear projection system resides in the angle of view of the image. In the system described herein, an image is visible only when there is a straight line light ray from the aperture through the image point to the viewer (FIG. 11). A conventional projection system, on the other hand, has an angle of view primarily dependent upon the screen structure and not upon the aperture — image relationship herein described.

Figures 12, 12A, 13, 13A:
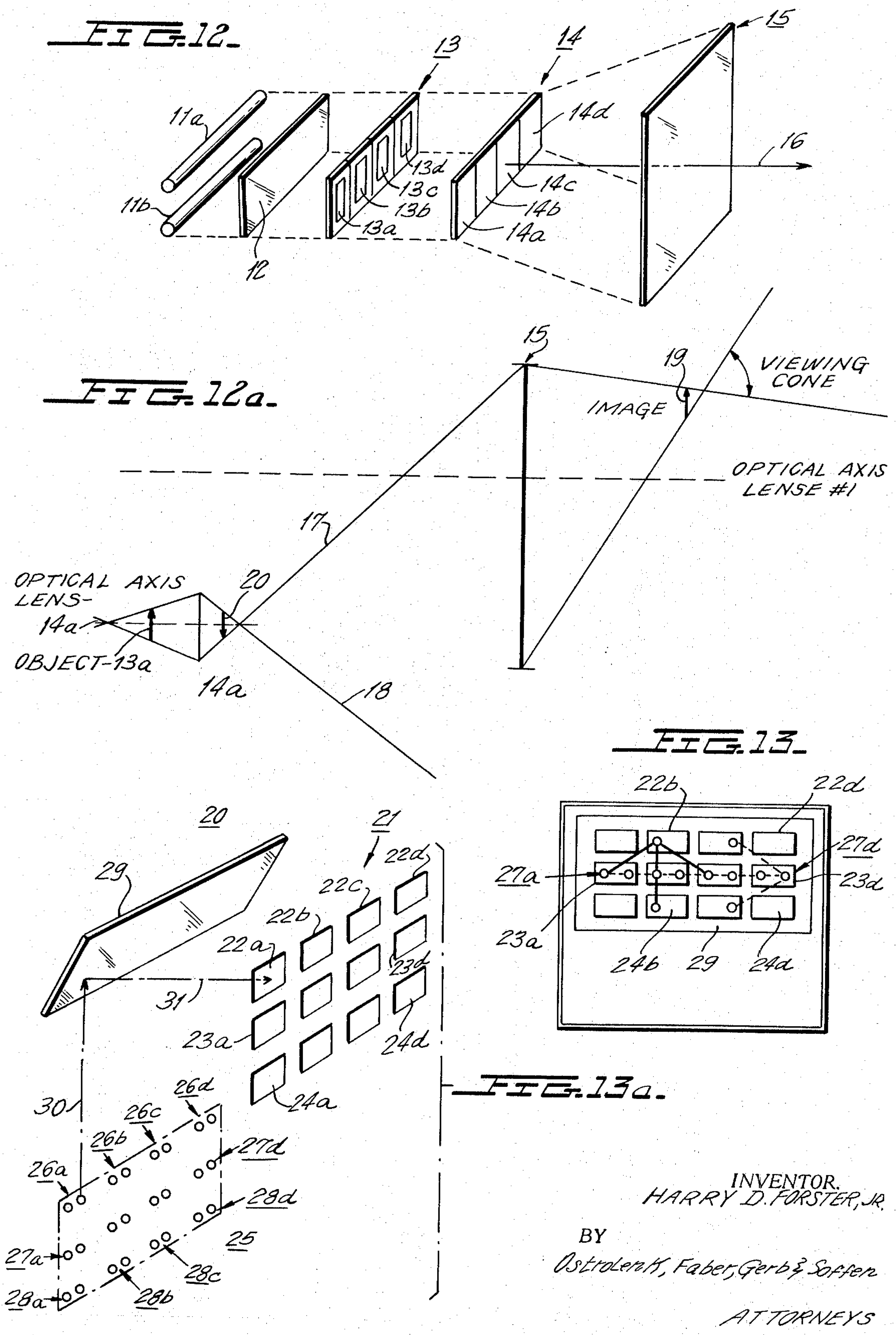

FIG. 12 shows a more detailed view of one preferred embodiment 10 of the present invention which is comprised of a lignt source in the form of a pair of florescent tubes 11*a* and 11*b*. A diffuser panel 12, preferably in the form of a white colored translucent (but not transparent) is positioned in front of the light sources 11*a* and 11*b*. A cartridge 13 is positioned in front of the diffuser panel and, in the embodiment of FIG. 12, comprises four separate transparencies 13*a*–13*d*, respectively. A first lens arrangement 14 comprised of individual lenses 14*a*–14*d* are positioned in a substantially planar array with each of the individual lenses 14*a*–14*d* being arranged substantially in alignment with each of the transparencies 13*a*–13*d*, respectively. An aperture lens 15 is positioned in substantially spaced parallel fashion with the first lens assembly 14. In the embodiment of FIG. 12 Fresnel lenses have been employed, however, other optical elements may be utilized with equal success.

The optical effect of the system 10 is such that the virtual image which will be viewed by a person positioned to the right of aperture lens 15 is dependent upon the position of the person. For example, if the viewer is positioned to the left of imaginary center line 16, an image of the transparency 13*a* will be in view. As the individual moves from this position toward the right the image will substantially abruptly change. Dependent upon the separation distances between transparencies 13 and the four-element lens assembly 14 and between the four-elements lens assembly 14 and the aperture lens 15 the image seen by the viewer may be adjusted so as to appear to be slightly behind (i.e. to the left) of aperture lens 15 or alternatively in front of (i.e. to the right) aperture lens 15. In any case, regardless of the position of the viewer, the single image viewed will appear to fill the entire aperture. Whereas the apparatus of FIG. 12 has been found to produce the optical results set forth hereinabove regardless of its theory of operation, an explanation of theory of operation is set forth hereinbelow, which description should in no way be considered to limit the effectiveness and operability of the apparatus.

Light rays emanate in an omni-directional fashion from the object (i.e. the transparencies 13*a*–13*d*). The only rays that will be transformed by aperture lens 15 are those contained between the marginal rays extending from the extremes of the object. All other rays will fail to strike their associated lenses 14*a*–14*d*. The marginal rays will be transformed and will form a cone of illumination in which the rays of the image will be present. Considering FIG. 12*a*, the aperture lens 15 is positioned entirely within the cone of illumination as represented by lines 17 and 18.

The aperture then creates the image 19 that is viewed by the observer. Since the aperture is fully illuminated, the viewing cone is determined by the image size, projection distance and the aperture size. An observer located anywhere within the viewing cone is thus able to receive rays from all portions of the aperture yielding the optical effect that the image fills the entire aperture.

Let it be assumed that the aperture lens extends higher than its present position, as shown in FIG. 12*a*. Since the cone of illumination from the intermediate object does not extend any higher, these additional portions of the aperture lens 15 will not be useful in creating an image and the viewing cone would be exactly that shown. An observer located in the viewing cone would have no additional benefits from the upper portions of the lens and he would therefore feel that the image did not extend into that region.

If the extension of the aperture lens were made in a downward direction, the additional portion of the lens would have been illuminated, provided the extension did not go beyond the cone of illumination (i.e. below marginal ray 18). In this case the screen would have been filled again and the observer would have a broader viewing cone.

FIGS. 13 and 13*a* shows still another embodiment 20 of the present invention which is useful in describing the mosaic effect obtained through the techniques of the present invention. The embodiment 20 comprises an optical lens array 21 having three rows of aperture lenses with each of the individual rows having four separate aperture lenses. For example, the uppermost row comprises lenses 22*a*–22*d*, the second row comprises lenses 23*a*–23*d*, while the lowermost row comprises lenses 24*a*–24*d*. The lenses form a regular matrix pattern so as to be further arranged in vertically aligned columns. For example, the left-handmost column comprises lenses 22*a*, 23*a* and 24*a*, the next column comprises lenses 22*b*, 23*b* and 24*b*, and so forth.

An array of 25 point light sources is provided which in the example is comprised of pairs of light sources arranged in a regular row and column matrix fashion with the uppermost row being comprised of point light source pairs 26*a*–26*d*, the middle row being comprised of point light source pairs 27a–27d and the lowermost row being comprised of point light source pairs 28*a*–28*d*. The light source are arranged so as to cooperate with an associated aperture lens member. For example, the point light source pair 26a cooperates with the aperture lens 22*a*. The remaining point light sources cooperate with other associated lenses in a similar fashion. The point light sources emanate rays which are directed upwardly against the reflective surface of a diagonally aligned mirror 29 which reflects an upwardly directed ray such as, for example, ray 30 in a horizontal direction as shown by reflected ray 31 so as to impinge upon lens 22*a*. By selective energization of the point light sources different patterns may be obtained. For example, the right-hand point light sources of pairs 27*a*–27*d*, 26*c* and 28*c* so as to cooperatively form an arrow as shown best in FIG. 13. The left-hand point light sources of the point light source pairs 26*b*, 27*b*, 28*b*, 27*a* and 27*c* may be selectively illuminated so as to form a second arrow which is directed vertically upward as opposed to the first arrow which is directed horizontally and to the right. The arrow which is viewed in dependent upon the position of the observer whereby only one of the arrows will be visible by an observer dependent upon his position. This is due to the alignment of the point light source relative to their associated lenses. In this embodiment it can be seen that each lens contributes only a portion of the final composite image, thus providing the mosaic effect.

In view of the foregoing, it will be apparent that the system here described also differs from that of conventional arrangements in that its operation will be substantially the same, whether the image produced be real or virtual. Similarly, while the conventional system is one in which light rays are observed as passing through the image, that disclosed herein operates equally as well for light rays reflected from the image. Such a characteristic permits viewing of roadside type sign information when an image is illuminated by the headlights of an oncoming vehicle. It is just these differences, amongst others, which enable the system of the invention to produce visual effects unlike those accompanying any single conventional element.

What is claimed is:

1. A mosaic system for displaying different information in discrete respective viewing areas to an observer moving through the viewing areas, which system is formed of a plurality of optical assemblies, each assembly having total and partial viewing field properties determined by their design and relative positions such that the assemblies comprising the mosaic system cooperatively create a visually observable field that selectively presents directly viewed observable information to predetermined locations through which an observer passes;

each of said optical assemblies including:

at least one information source and an optical element for creating an image of said information source viewable within a predetermined cone of vision defining at least one of said viewing areas which is contained within the total cone of vision created by said system;

the image of at least a portion of the information source of at least two of said optical assemblies being simultaneously viewable by both eyes of an observer as the observer passes through the predetermined cone of vision within the total cone of vision of said system;

each of said information sources being comprised of at least first and second source portions displaced from one another and cooperating with their associated optical elements to create images of said source portions which lie in separate viewing areas within the total cone of vision of the display system;

at least one of the information source portions of each of two of said assemblies being imaged in the same portion of a common viewing cone to be simultaneously visible by both eyes of an observer passing through said common viewing cone.

2. A display system for displaying information to a moving observer, which display information changes as the observer moves relative to the system, wherein the system comprises:

a plurality of discrete lens elements arranged in a spatial fashion, all of said elements lying substantially in a plane;

a first array of information sources wherein each information source in said first array is associated with a selected one of said lens elements;

a second array of information sources wherein selected ones of the information sources in said second array are associated with selected ones of said lens elements;

said lens elements each being adapted to create images of their associated sources comprising said first array of sources within a first viewing cone to form a first composite image array and being further adapted to create images of their associated sources comprising said second array of sources within a second viewing cone to form a second composite image array;

said first and second viewing cones being displaced from one another to enable an observer to view all of the cooperating images of only one of said composite arrays simultaneously with both eyes as the observer moves through the viewing cone containing that composite array;

each of said information sources being comprised of a transparency and a light source for passing light rays through said transparency and the lens element associated with the light source and transparency.

3. A system for displaying information to a moving observer, which information changes as the observer changes his position relative to said system comprising:

a plurality of separate illuminated information sources arranged at spaced intervals in a predetermined sequence;

a plurality of objective lens means each being associated with one of said information sources for creating an image of its associated object wherein all of said images are created in a common image plane;

a common field lens for re-imaging the images created by each of said objective lens means to create viewing images, each individual viewing image being viewable simultaneously by both eyes of an observer in discrete viewing positions spaced from one another whereby an observer moving through said viewing positions will sequentially observe the viewing images created by said common field lens while moving through their respective viewing positions.

4. The display system of claim 3 wherein the aperture of said common field lens is greater than the aperture of each of said objective lens means and the image viewed at any of said viewing positions by an observer fills substantially the entire aperture of said common field lens.

5. The system of claim 4 wherein said field lens and each of said objective lens means is a Fresnel lens.

6. The system of claim 4 wherein each information source is a transparency illuminated by a light source positioned to pass rays through its associated transparency, objective lens means and the common field lens.

7. The system of claim 6 wherein each of the transparencies is smaller than the aperture of said common field lens.

8. A mosaic system for displaying information to a moving observer, which information changes as the observer changes his position relative to said system comprising:

a first plurality of separate illuminated information sources arranged at spaced intervals in predetermined sequence;

a first plurality of objective lens means each being associated with one of said associated information sources for creating an image of its associated object wherein all of said images are created in a common image plane;

a first common field lens for re-imaging the images created by each of said objective lens means to create first viewing images of said first plurality of information sources, each individual viewing image being viewable simultaneously by both eyes of an observer in discrete viewing positions spaced from one another;

a second plurality of separate illuminated information sources spaced from said first plurality of information sources and arranged at spaced intervals in a second predetermined sequence;

a second plurality of objective lens means each being associated with one of the information sources in said second plurality of information sources for creating an image of its associated information source wherein all of said images are created in a second common image plane;

a second common field lens for re-imaging the images created by each objective lens means in the second plurality of objective means to create a second group of viewing images, each individual viewing image within the second group of viewing images being viewable simultaneously by both eyes of an observer in the respective discrete viewing positions in which the first group of viewing images are arranged whereby an observer moving through said viewing positions will observe associated viewing images from said first and second group of viewing images at each of the discrete viewing positions to create a composite viewing image at each of said discrete positions, each of the composite viewing images being formed of images of one of the information sources in the first plurality of information sources and one of the information sources in the second plurality of information sources.

* * * * *